US008195648B2

(12) United States Patent
Zabback et al.

(10) Patent No.: US 8,195,648 B2
(45) Date of Patent: Jun. 5, 2012

(54) PARTITIONED QUERY EXECUTION IN EVENT PROCESSING SYSTEMS

(75) Inventors: Peter Zabback, Kirkland, WA (US); Tihomir Tarnavski, Redmond, WA (US); Beysim Sezgin, Redmond, WA (US); Tomer Verona, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/603,385

(22) Filed: Oct. 21, 2009

(65) Prior Publication Data

US 2011/0093491 A1 Apr. 21, 2011

(51) Int. Cl.
*G06F 17/30* (2006.01)

(52) U.S. Cl. ............ 707/718; 707/713; 706/12; 706/14; 706/41

(58) Field of Classification Search .................. None
See application file for complete search history.

(56) References Cited

U.S. PATENT DOCUMENTS

| | | | |
|---|---|---|---|
| 5,691,917 A | 11/1997 | Harrison | |
| 5,809,235 A | 9/1998 | Sharma et al. | |
| 6,145,009 A | 11/2000 | Miyazawa et al. | |
| 6,336,139 B1 | 1/2002 | Feridun et al. | |
| 6,338,055 B1* | 1/2002 | Hagmann et al. | ........................ 1/1 |
| 6,449,618 B1* | 9/2002 | Blott et al. | ............................. 1/1 |
| 6,925,631 B2 | 8/2005 | Golden | |
| 7,065,561 B2 | 6/2006 | Fry et al. | |
| 7,349,675 B2 | 3/2008 | Karr et al. | |
| 7,457,728 B2 | 11/2008 | Chen et al. | |
| 7,836,071 B2* | 11/2010 | Glowacki et al. | ............. 707/769 |
| 7,840,575 B2* | 11/2010 | Chandrasekaran | ........... 707/754 |
| 2005/0055631 A1 | 3/2005 | Scardina et al. | |
| 2005/0138081 A1 | 6/2005 | Alshab et al. | |
| 2005/0165724 A1 | 7/2005 | West | |
| 2005/0182758 A1 | 8/2005 | Seitz et al. | |
| 2006/0069942 A1 | 3/2006 | Brasilerio | |
| 2006/0123119 A1 | 6/2006 | Hill et al. | |
| 2006/0230029 A1* | 10/2006 | Yan | ..................................... 707/3 |
| 2006/0248182 A1 | 11/2006 | Glassco et al. | |
| 2007/0136239 A1 | 6/2007 | Lee et al. | |
| 2007/0168990 A1 | 7/2007 | Alshab et al. | |
| 2007/0255529 A1 | 11/2007 | Biazetti et al. | |
| 2008/0134158 A1 | 6/2008 | Salz et al. | |
| 2008/0256384 A1 | 10/2008 | Branson et al. | |
| 2008/0301124 A1* | 12/2008 | Alves et al. | ........................ 707/5 |
| 2008/0301125 A1* | 12/2008 | Alves et al. | ........................ 707/5 |
| 2008/0301135 A1* | 12/2008 | Alves et al. | ........................ 707/6 |
| 2009/0052341 A1 | 2/2009 | Enqvist | |

(Continued)

OTHER PUBLICATIONS

Ding et al, "Runtime Semantic Query Optimization for Event Stream Processing", IEEE, 2008.*

(Continued)

*Primary Examiner* — Hung Le

(74) *Attorney, Agent, or Firm* — Merchant & Gould P.C.

(57) ABSTRACT

Methods, systems, and computer-readable media are disclosed for partitioned query execution in event processing systems. A particular method includes receiving a plurality of events via an input stream. The plurality of events is partitioned into one or more groups, and a query application module is instantiated for each of the one or more groups based on a compiled query application plan. Each particular query application module for a particular group is configured to apply a query to events of the particular group to generate partial results. The method includes merging the partial results of each of the query application modules to generate merged output results and providing the output results to an output stream.

18 Claims, 7 Drawing Sheets

U.S. PATENT DOCUMENTS

| | | | |
|---|---|---|---|
| 2009/0070765 | A1 | 3/2009 | Alves et al. |
| 2009/0100029 | A1 | 4/2009 | Jain et al. |
| 2009/0125550 | A1 | 5/2009 | Barga et al. |
| 2009/0125635 | A1 | 5/2009 | Barga et al. |
| 2010/0017380 | A1* | 1/2010 | Naibo et al. ............... 707/4 |
| 2011/0246445 | A1* | 10/2011 | Mishra et al. ............. 707/713 |

OTHER PUBLICATIONS

Liu et al, "Multi-Model Based Optimization for Stream Query Processing", Indiana University, 2006.*

Vijayakumar et al, "Tracking Stream Provenance in Complex Event Processing Systems for Workflow-Driven Computing", ACM, 2007.*

Wilschut et al, "Dataflow Query Execution in a Parallel Main-Memory Environment", IEEE, 1991.*

Wu et al, "High-Performance Complex Event Processing over Streams", SIGMOD, 2006.*

"Jiang, et al", "Estreams: Towards an Integrated Model for Event and Stream Processing", retrieved at <<http://ariana.uta.edu/research/Publications/Downloads/CSE-2004-3.pdf>>, Jul. 1, 2004. pp. 25.

"Complex Event Processing Made Simple Using Esper", retrieved at <<http://www.theserverside.com/tt/articles/article.tss?I=ComplexEventProcessing>>, Apr. 2008. pp. 5.

Bry et al, "A High-Level Query Language for Events", retrieved at <<http://www.pms.ifi.Imu.de/mitarbeiter/eckert/publications/EDA-PS2006.pdf>>, 2006. pp. 8.

Wei et al, "ReCEPtor: Sensing Complex Events in Data Streams for Service-Oriented Architectures", retrieved at <<http://www.hpl.hp.com/techreports/2007/HPL-2007-176.pdf>>, Nov. 2, 2007. pp. 22.

"Oracle CEP 11gR1—official support for CQL", retrieved at <<http://adcalves.wordpress.com/2009/07/01/oracle-cep-11gr1-official-support-for-cql/>>, Jul. 1, 2009. pp. 3.

Barga et al, "Consistent Streaming Through Time: A Vision for Event Stream Processing", retrieved at <<http://www.cs.cornell.edu/~mshong/papers/cidr%2007%20cedr.pdf>>, Jan. 7-10, 2007. pp. 12.

"Explicit Server Development Model", retrieved at <<http://msdn.microsoft.com/en-us/library/ee391319(SQL.105).aspx>>, pp. 3.

"SQL Server 2008 R2—StreamInsight Technology", retrieved at <<http://www.microsoft.com/sqlserver/2008/en/us/R2-complex-event.aspx>>, pp. 2.

"Microsoft StreamInsight", retrieved at <<http://msdn.microsoft.com/en-us/library/ee362541(SQL.105,printer).aspx>>, pp. 1.

Grabs et al, "Introducing Microsoft's Platform for Complex Event Processing", May 2009. pp. 24.

Grabs et al, "Introducing Microsoft StreamInsight", Sep. 2009. pp. 27.

Jiang et al, "Anatomy of a Data Stream Management System", retrieved at <<http://ftp.informatik.rwth-aachen.de/Publications/CEUR-WS/Vol-215/paper12.pdf>>, 2004. pp. 16.

"Complex Event Processing (CEP)", retrieved at <<http://www.progress.com/psm/apama/data-streams/index.ssp>>, Mar. 9, 2007. pp. 2.

Wu et al, "High-Performance Complex Event Processing over Streams", retrieved at <<http://www.cs.umass.edu/~yanlei/publications/sase-sigmod2006.pdf>>, 2006. pp. 12.

"Event-Driven Models and Complex Event Processing", retrieved at <<http://www.cxo.eu.com/article/Event-driven-models-and-complex-event-processing/>>, 2009. pp. 3.

Snoeren et al, "Mesh-Based Content Routing using XML", retrieved at <<http://xml.coverpages.org/SnoerenMESH-XML.pdf>>, 2001. pp. 14.

Ravindran et al, "A Resource Management Model for Dynamic, Scalable, Dependable, Real-Time Systems", retrieved at <<http://citeseerx.ist.psu.edu/viewdoc/download?doi=10.1.1.40.5779&rep=rep1&type=ps>>, Apr. 11, 2006. pp. 6.

Johnson et al, "A Heartbeat Mechanism and its Application in Gigascope", retrieved at <<http://www.vldb.org/conf/2005/papers/p1079-johnson.pdf>>, 2005. pp. 10.

Oberoi et al, "Integrating DDS and COTS Complex-Event Processing Engines", retrieved at <<http://www.omg.org/news/meetings/workshops/RT-2007/04-5_Oberoi_etal-revised.pdf>>, Jul. 2007. pp. 42.

Srivastava et al, "Flexible Time Management in Data Stream Systems", retrieved at <<http://infolab.stanford.edu/~usriv/papers/time.pdf>>, PODS 2004 Jun. 14-16, 2004, Paris, France. pp. 11.

* cited by examiner

PARTITIONED QUERY EXECUTION IN EVENT PROCESSING SYSTEMS

BACKGROUND

The event-based computation paradigm has grown in importance for enterprises. For example, many business applications and system control applications can be developed based on event-based computation. Generally, event processing applications receive events, analyze the events, and output results (e.g., proposed actions) based on the analysis of the events.

Analyzing the events with an event processing application may include applying a query to the events. The query may often be complex and include various execution stages. Many event processing systems execute the operations of a query sequentially, regardless of complexity. However, sequential query execution may result in reduced throughput at event processing systems.

SUMMARY

The present disclosure describes partitioned query execution (e.g., in a multi-core or distributed event processing system). Partitioned execution of a query may occur in two stages: a compile-time stage and a run-time stage. At compile-time, the query may be examined and a query application plan may be generated for the query. At run-time, events received by the event processing system via an input stream may be partitioned into multiple groups, and a separate query application group may be created for each group. The query application groups may apply the query to events in parallel and partial results produced by each query application group may be merged to form an output stream.

Various operations may be performed to improve the performance of partitioned query execution. For example, query application modules may be added (e.g., due to new and previously-unencountered event data) and deleted (e.g., due to punctuation events) at run-time without requiring re-compilation of the query application plan. As another example, in multi-threaded systems where operators of the query execute on separate threads, operator logic for multiple operators (e.g., lightweight operators) may be identified and merged so as to execute on a single thread.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
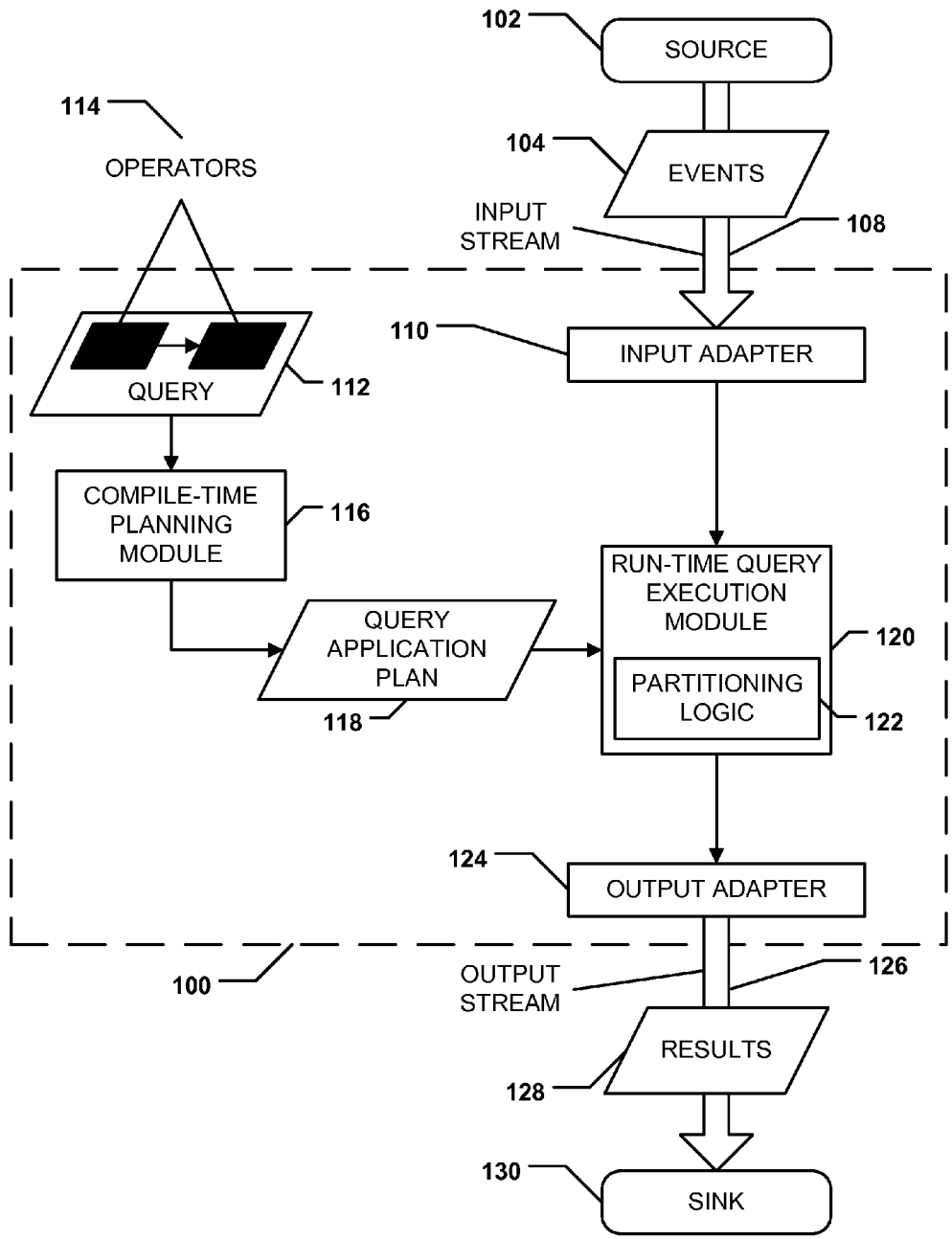
FIG. 1 is a diagram to illustrate a particular embodiment of a system to perform partitioned query execution.

Systems, methods, and computer-readable media to perform partitioned query execution are disclosed. In a particular embodiment, a computer system is disclosed that includes a planning module configured to generate a query application plan based on a query that includes a partitioning operator. The computer system also includes an execution module configured to partition a plurality of events into one or more groups based on the partitioning operator. The execution module is also configured to instantiate a query application module for each of the one or more groups based on the query application plan. Each particular query application module for a particular group includes data associated with the query and group-specific data associated with the particular group. Each particular query application module is configured to apply the query to events of the particular group to generate results. The execution module is further configured to merge results of each of the query application modules.

In another particular embodiment, a method is disclosed that includes receiving a plurality of events via an input stream and partitioning the plurality of events into one or more groups. The method also includes instantiating a query application module for each of the one or more groups. Each particular query application module for a particular group is configured to apply the query to events of the particular group to generate partial results. The method further includes merging the partial results of each of the query application modules to generate merged output results and providing the merged output results to an output stream.

In another particular embodiment, a computer-readable medium is disclosed. The computer-readable medium includes instructions, that when executed by a computer, cause the computer to receive a user-defined query that includes a partitioning operator and at least one non-partitioning operator and to compile a query application plan for the query, where the query application plan indicates how to parallelize application of the at least one non-partitioning operator. The computer-readable medium further includes instructions, that when executed by the computer, cause the computer to receive a plurality of events via an input stream during a run-time of the computer. The computer-readable medium includes instructions, that when executed by the computer, cause the computer to partition the plurality of events into one or more groups based on the partitioning operator. The computer-readable medium also includes instructions, that when executed by the computer, cause the computer to instantiate a plurality of query application modules based on the compiled query application plan. Each particular query application module is associated with a particular group and is configured to apply the at least one non-partitioning operator to events of the particular group to generate partial results. Each query application module is associated with a single group. The computer-readable medium includes instructions, that when executed by the computer, cause the computer to merge the partial results of each of the query application modules to generate output results and to provide the output results to an output stream.

FIG. 1 is a block diagram to illustrate a particular embodiment of a system 100 to perform partitioned query execution. The system 100 is configured to receive events 104 from a source 102 via an input adapter 110 and to transmit results 128 to a sink 130 via an output adapter 124. Generally, the system 100 may perform partitioned query execution of a query 112 on events (e.g., the events 104) received by the system 100. In a particular embodiment, the system 100 is included in a complex event processing (CEP) system.

The system 100 includes a compile-time planning module 116 configured to generate (e.g., compile) a query application plan 118 for a query 112. The query 112 may include a directed graph of operators 114. In a particular embodiment, the operators 114 include at least one partitioning (e.g., grouping) operator and at least one non-partitioning (e.g., projection or selection) operator.

The system 100 also includes a run-time query execution module 120. During a run-time of the system 100, partitioning logic 122 (e.g., logic corresponding to partitioning or grouping operator(s) of the query 112) at the run-time query execution module 120 may partition events received at the input adapter 110 via the input stream 108 into one or more groups. Per the query application plan 118, compiled operators corresponding to the operators 114 of the query 112 before compilation may be applied to events of each of the one or more groups in parallel. It should be noted that the relationship between the compiled operators and the operators 114 of the query 112 before compilation may not necessarily be one-to-one. The compile-time planning module may modify existing operators or add new operators. An illustrative query execution plan is described with reference to FIG. 3. Application of the query 112 in accordance with the query application plan 118 may generate results 128 that are transmitted to the sink 130 from the output adapter 124 via an output stream 126. In a particular embodiment, application of the query 112 to events in each of the one or more groups generates partial results, and the partial results are merged to generate the output results 128 that are transmitted to the sink 130. In a particular embodiment, merging the partial results includes application of a union operator added to the query application plan 118 by the compile-time planning module 116. Thus, merging the partial results may be a part of query execution.

In operation, the compile-time planning module 116 may generate the query application plan 118, where the query application plan 118 indicates how to parallelize execution of the query 112 (e.g., a user-defined declarative query provided by a user of the system 100) during a run-time of the system 100. During run-time, the input adapter 110 may receive the events 104 from the source 102 via the input stream 108 and may transmit the events 104 to the run-time query execution module 120. The partitioning logic 122 may place the events 104 into various groups, and the query 112 may be applied to the events 104 to generate the results 128. The results 128 may be transmitted by the output adapter 124 to the sink 130 via the output stream 126.

It will be appreciated that the system 100 of FIG. 1 may enable parallelized execution of queries (e.g., the query 112), thereby improving performance at event processing systems, such as the system 100 of FIG. 1. It should be noted that although partitioned query execution is described herein with reference to partitioning and operators, partitioned query execution may be implemented with respect to any parallelizable query operations.

Figure 2:
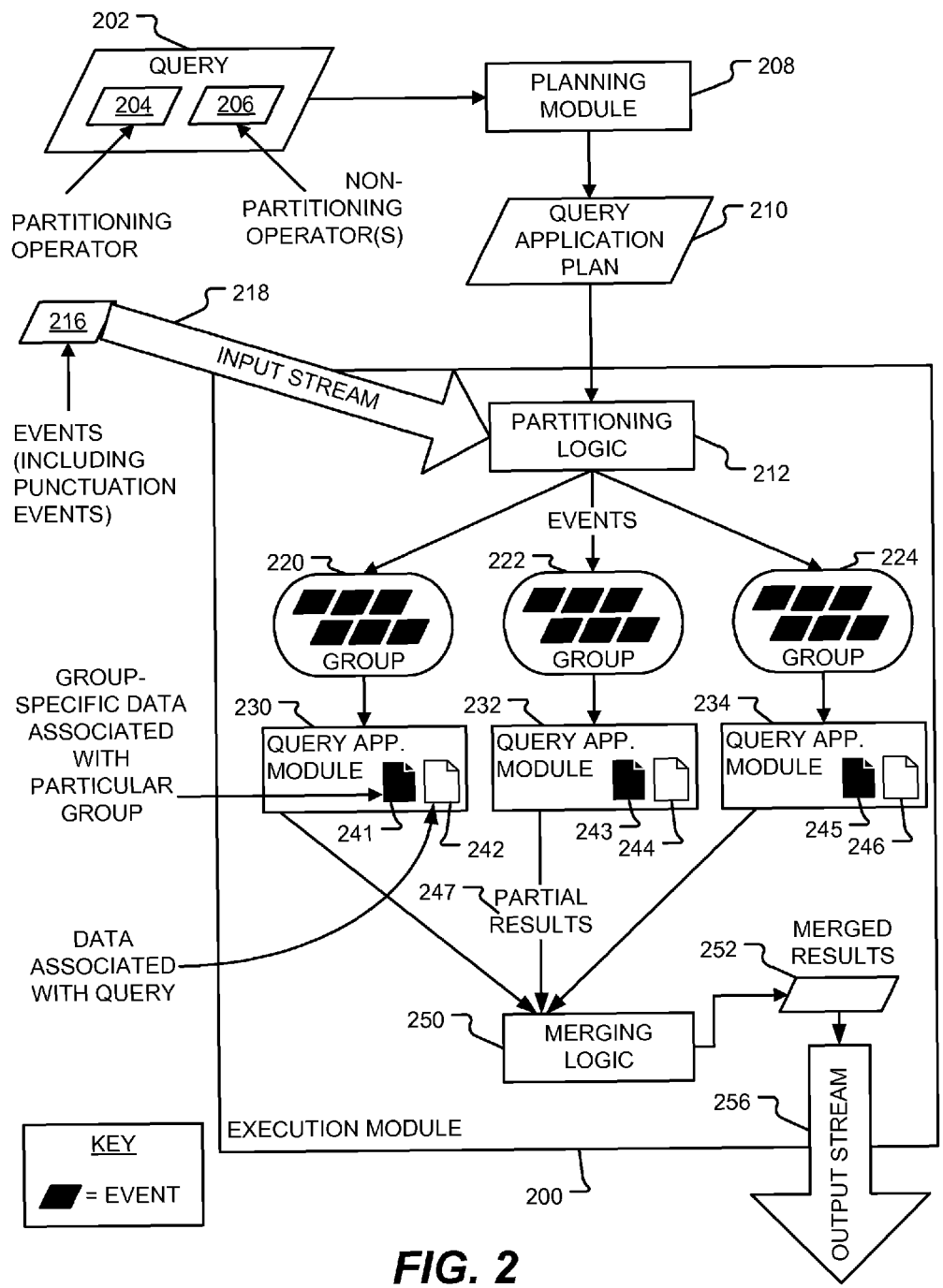
FIG. 2 is a diagram to illustrate a particular embodiment of the run-time query execution module of the system of FIG. 1.

FIG. 2 is a block diagram to illustrate a particular embodiment of an execution module 200. The execution module 200 is configured to access a query application plan 210 generated by a planning module 208. The execution module 200 is also configured to receive events, including punctuation events 216, via an input stream 218, and to provide merged results 252 to an output stream 256. In an illustrative embodiment, the execution module 200 is the run-time query execution module 120 of FIG. 1 and the planning module 208 is the compile-time planning module 116 of FIG. 1.

The execution module 200 includes partitioning logic 212. The partitioning logic may be logic corresponding to mathematical formulae of the query 202 that describe how to partition events. It will thus be appreciated that the partitioning logic 212 is not hard-coded at the execution module 200 and may instead change as the query 202 changes. The execution module 200 may receive events 216 (e.g., via an input adapter) from the input stream 218, and the partitioning logic 212 may partition the events 216 into a plurality of groups (e.g., illustrative groups 220, 222, and 224) in accordance with the query application plan 210. For example, each of the events 216 may include a stock ticker symbol and a current price associated with the stock ticker symbol, and a query 202 (e.g., a continuously executing complex event processing (CEP) query) may be configured to determine the average price of a stock represented by a particular ticker symbol over a window of ten minutes. Thus, the query 202 may include partitioning operator(s) 204 "WINDOW 10 minutes" and "GROUP BY Ticker Symbol," and non-partitioning operator(s) 206 "AGGREGATE Average(Price)." It should be noted that the partitioning operator(s) 204 are not limited to time-based partitions. The partitioning operator(s) 204 may also partition the events based on a hashing function introduced to parallelize execution of the query 202. The query application plan 210 may instruct the partitioning logic 212 to maintain a separate group (e.g., the groups 220, 222, and 224) for each stock ticker symbol and may indicate how to execute the non-partitioning operator(s) 206 on the events of each group in parallel (e.g., via query execution modules 230, 232, and 234).

The execution module 200 includes a plurality of query application modules, including one query application module for each group (e.g., the query application module 230 for the group 220, the query application module 232 for the group 222, and the query application module 234 for the group 224). Each query application module 230, 232, and 234 may be instantiated based on the query application plan 210 and may be configured to execute the non-partitioning operator(s) 206 on events of the group associated with the respective query application module. For example, the query application modules 230, 232, and 234 may include logic to determine, for a particular event having a particular stock ticker symbol and a particular current price, what the average price of the stock represented by the particular ticker symbol is over the past ten minutes.

In a particular embodiment, the partitioning logic 212 is configured to receive punctuation events, such as current time increment (CTI) events, via the input stream 218. Punctuation events may be used at an event processing system where events have "lifetimes" or "validity" times. For example, an event may include a validity start time and a validity end time in addition to an event payload, where the validity end time may not be earlier than the validity start time. The validity time period for such an event is the time period between the validity start time and the validity end time. Validity times may enable the inclusion of time-based operators (e.g., windowing operators) in the query 202. When an event processing system implements processing of events with event validity times, punctuation events may be received (e.g., periodically received) by the event processing system. In a particular embodiment, a punctuation event includes a timestamp that "promises" the system that any event received subsequent to the punctuation event will not have a validity start time earlier than the timestamp. Thus, the punctuation event may serve as a clock tick. For example, if the punctuation event has a time stamp of "12:00:00 pm," then no event subsequently received by the system will have a validity start time of "11:59:59 am" or earlier. The system may make event processing decisions based on this "promise." For example, events that are no longer valid (e.g., events that have validity end times earlier than "12:00:00 pm") may be deleted.

Each query application module 230, 232, and 234 may include "global" data (e.g., query-specific data associated with the query) as well as "local" data (e.g., group-specific data associated with a particular group). For example, the query application module 230 includes group-specific data 241 and query-specific data 242, the query application module 232 includes group-specific data 243 and query-specific data 244, and the query application module 234 includes group-specific data 245 and query-specific data 246. In a particular embodiment, the query-specific data includes current time increment (CTI) indexes indicating the earliest CTI timestamp that will affect each operator of the query. In the average stock price example above, the group-specific data for each group may include stock prices over the previous ten minutes for the ticker symbol associated with each group. Each query application module 230, 232, 234 may generate partial results via application of the non-partitioning operator(s) 206. For example, each query application module 230, 232, 234 may generate partial results 247, where each partial result includes a stock ticker symbol and a floating point value indicating the average price of the stock over the previous ten minutes.

The execution module 200 includes merging logic 250 configured to receive partial results 247 from each of the query application modules 230, 232, and 234 and to merge the partial results 247 to generate merged results 252. The merging logic 250 is also configured to provide the merged results 252 (e.g., via an output adapter) to an output stream 256. In a particular embodiment, the merging logic 250 includes application of a union operator.

The partitioning logic 212 may be configured to determine whether or not to transmit (e.g., forward) a received punctuation event to each of the query application modules 230, 232, and 234. In a particular embodiment, the partitioning logic 212 transmits the punctuation event to a particular query application module upon determining that the particular group associated with the particular query application module includes at least one event that has a validity start time previous to or equal to the timestamp of the punctuation event. For example, the partitioning logic 212 may transmit a punctuation event having a timestamp of "12:00:00 pm" to the query application module 230 upon determining that the group 220 includes an event having a validity start time of "11:00:00 am." The partitioning logic 212 may not transmit the punctuation event to a particular query application module upon determining that the particular group associated with the particular query application module does not include at least one event that has a validity start time previous to or equal to the timestamp of the punctuation event. For example, the partitioning logic 212 may not transmit a punctuation event having a timestamp of "12:00:00 pm" to the query application module 232 upon determining that the earliest validity start time of any event in the group 222 is "3:00:00 pm."

The query application modules 230, 232, and 234 may be configured to delete events from the groups 220, 222, and 224, respectively, when events are invalidated by the punctuation event. For example, when a punctuation event having a timestamp of "12:00:00 pm" is received, events having validity end times of "11:59:59 am" or earlier may safely be deleted because they are no longer valid. In a particular embodiment, the invalidated events may be sent to the output stream 256 before they are deleted. Thus, processing a punctuation event may result in emptying a group (e.g., all pending events in the group are invalidated by the punctuation event and therefore deleted). To achieve efficient utilization of resources, the execution module 200 may be configured to delete (e.g., de-allocate) query application modules for empty groups.

The execution module 200 may also be configured to instantiate additional query application modules for new groups without re-compilation of the query application plan 210 by the planning module 208. Thus, the query application plan 210 may be compiled without knowing the number of query application modules that will be instantiated based on the query application plan 210. For example, if the partitioning logic 212 partitions the events 216 by stock ticker symbol and an event is received that includes a new ticker symbol that has not previously been encountered, the execution module 200 may instantiate a new query application module for the new group of events that include the new ticker symbol. The number of instantiated query application modules may be based on a property of the query 202, a property of a computer system that includes the execution module 200 (e.g., a number of processors or an amount of available memory), some other criteria, or any combination thereof. For example, when events are partitioned based on payload (e.g., stock ticker symbol) the number of instantiated query application modules may be dynamic and determined at run-time by the number of unique stock ticker symbols that are encountered. As another example, when events are partitioned based on a user-defined hash function (e.g., a user-defined hash function that takes hardware resource availability into consideration), the number of query application modules may be static and known at compile-time.

In operation, the planning module 208 may compile the query application plan 210 for the query 202. Subsequent to compilation of the query application plan 210, the execution module 200 may receive the events 216 via the input stream 218. The partitioning logic 212 may partition the events 216 into the groups 220, 222, and 224 based on application of the partitioning operator 204 of the query 202 to the events 216. The execution module 200 may instantiate query application modules 230, 232, and 234 for each of the groups 220, 222, and 224 based on the query application plan 210. Each particular query application module for a particular group may apply the non-partitioning operator(s) 206 of the query 202 to generate partial results. The partial results from each of the query application modules 230, 232, and 234 may be transmitted to the merging logic 250, where the partial results are merged to generate merged results 252. The merged results 252 may be provided to an output stream 256.

In a particular embodiment, the execution module 200 of FIG. 2 is configured to receive punctuation events. In such an embodiment, the execution module 200 may receive a punctuation event and may selectively forward the punctuation event to one or more of the query application modules 230, 232, and 234. The execution module may also delete query application modules for empty groups and instantiate additional query application modules for new groups.

It will be appreciated that the execution module 200 of FIG. 2 may efficiently utilize resources during partitioned query execution by dynamically instantiating and deleting query application modules. It will also be appreciated that the execution module 200 of FIG. 2 may perform resource-conserving operations at run-time without re-compilation of the query application plan 210. It will further be appreciated that instead of automatically forwarding punctuation events to all modules, the execution module 200 of FIG. 2 may selectively forward punctuation events to only those query application modules to which the punctuation event is applicable, further improving performance and conserving resources.

Figure 3:
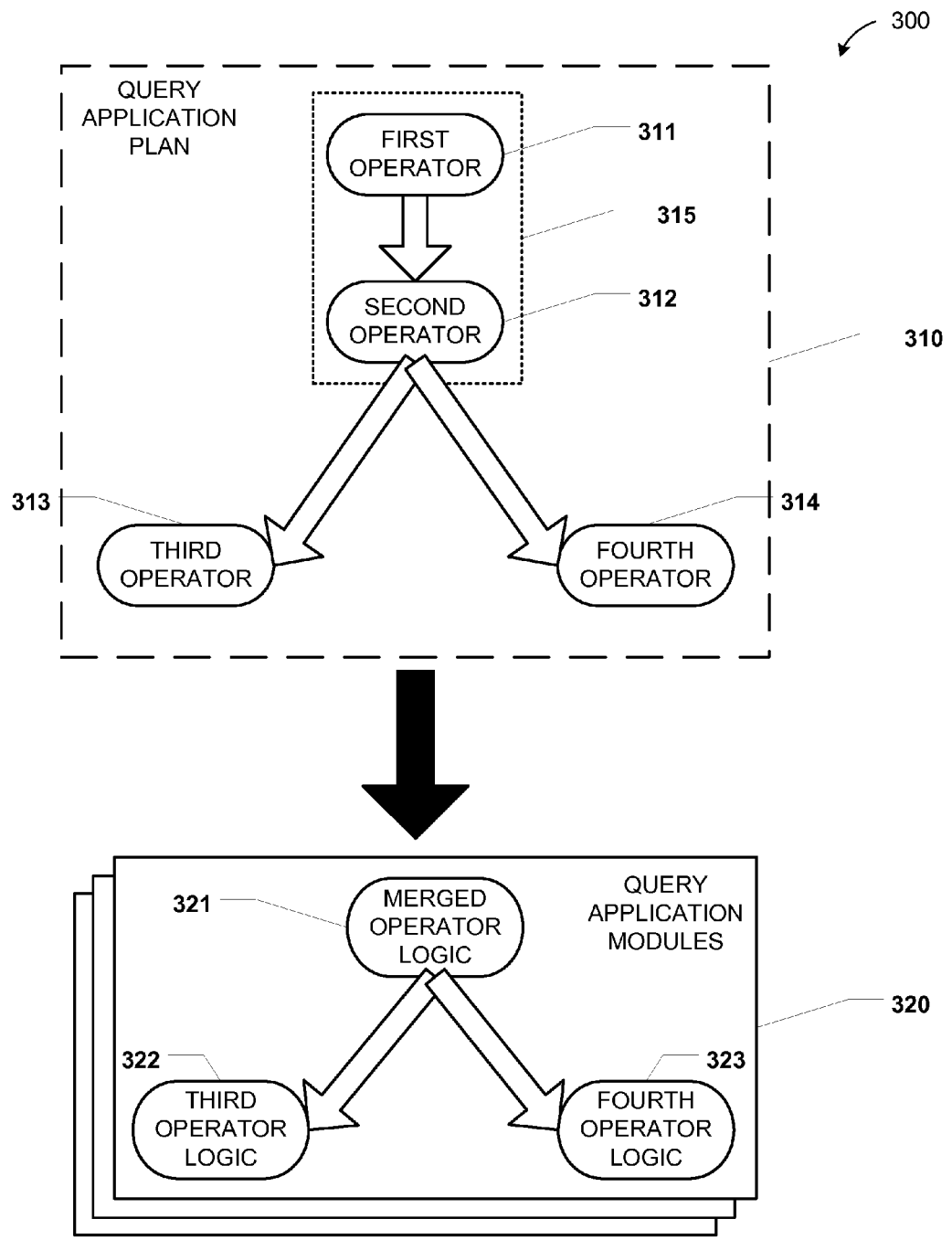
FIG. 3 is a diagram to illustrate a particular embodiment of a method of merging operator execution logic.

FIG. 3 is a diagram to illustrate a particular embodiment of a method 300 of merging operator execution logic. In an illustrative embodiment, the method 300 may be performed by the run-time query execution module 120 of FIG. 1 or the execution module 200 of FIG. 2. The method 300 may generate a plurality of query application modules 320 based on grouping operators of a query application plan 300, including merging execution logic for two or more operators of the query application plan 310. In an illustrative embodiment, the query application plan 310 is the query application plan 118 of FIG. 1 or the query application plan 210 of FIG. 2 and the query application modules 320 may include the query application modules 230, 232, and 234 of FIG. 2.

In a particular embodiment, the query application plan 310 may indicate that, by default, logic to execute each operator in the query application plan 310 is to execute on a separate thread at each of the query application modules 320 that are instantiated based on the query application plan 310. For example, the query application plan 310 may indicate that logic to execute the first operator 311 may execute on a first thread of each of the query application modules 320, logic to execute the second operator 312 may execute on a second thread of each of the query application modules 320, logic to execute the third operator 313 may execute on a third thread of each of the query application modules 320, and logic to execute the fourth operator 314 may execute on a fourth thread of each of the query application modules 320.

In a particular embodiment, the query application modules 320 may undergo transformations to more efficiently utilize resources. For example, the query application modules 320 may determine that the benefits of allocating separate execution threads for the logic to execute the first operator 311 and the logic to execute the second operator 312 may be outweighed by the costs of allocating the separate execution threads. For example, the first operator 311 and the second operator 312 may be lightweight and capable of efficient application to events. To conserve resources, the first operator 311 and the second operator 312 may be merged, so that the resulting merged operator logic 321 executes at a single execution thread. Logic 322 to execute the third operator 313 and logic 323 to execute the fourth operator 314 may remain unchanged and continue to be configured to execute in separate execution threads.

It will be appreciated the method 300 of FIG. 3 may improve performance at event processing systems by merging operator logic, thereby reducing a total number of execution threads used to execute a particular query.

Figure 4:
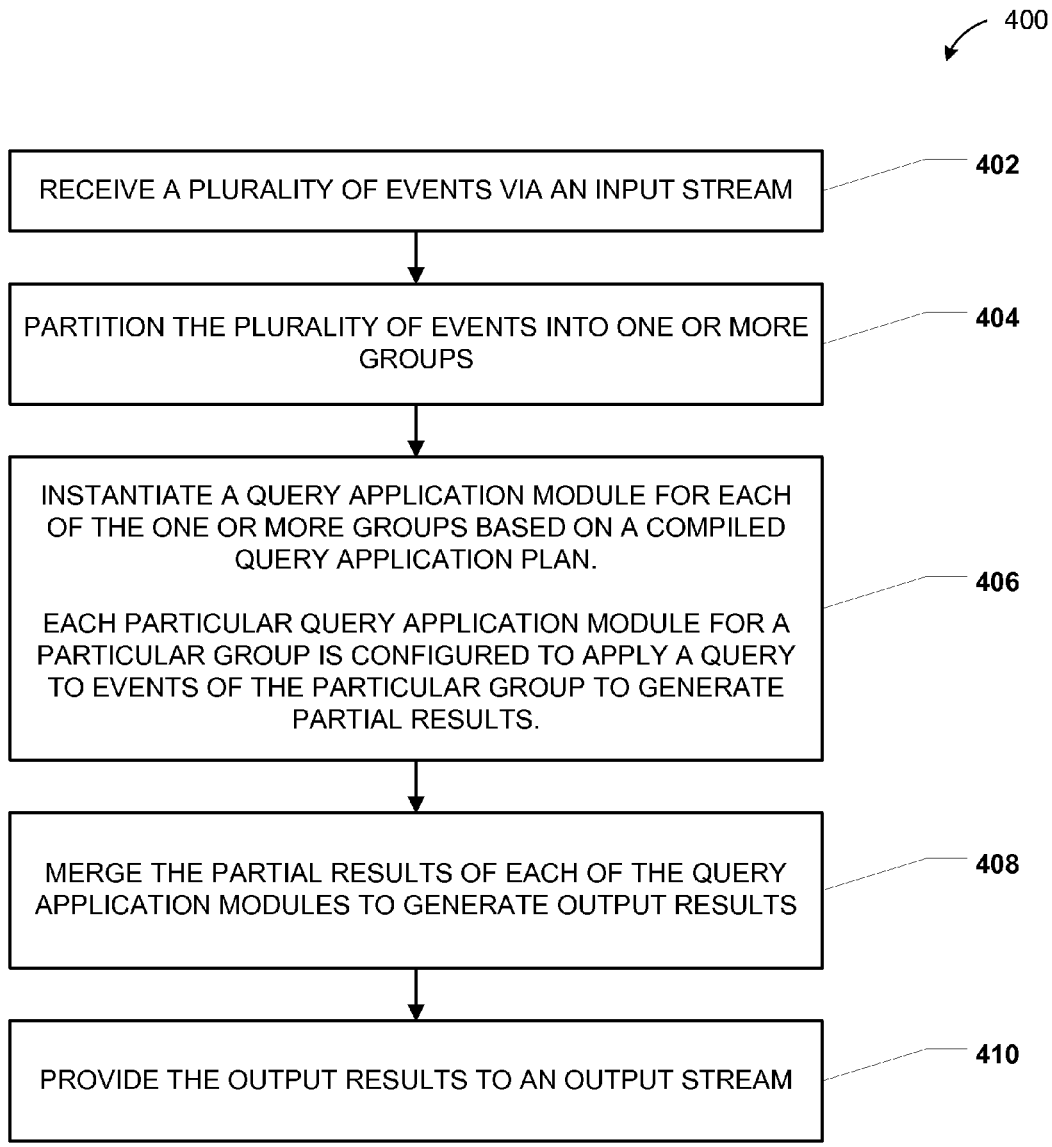
FIG. 4 is a flow diagram to illustrate a particular embodiment of a method of partitioned query execution.

FIG. 4 is a flow diagram to illustrate a particular embodiment of a method of partitioned query execution. In an illustrative embodiment, the method may be performed by the system 100 of FIG. 1 or the execution module 200 of FIG. 2.

The method 400 includes receiving a plurality of events via an input stream, at 402. For example, in FIG. 2, the execution module 200 may receive the events 216 via the input stream 218. The method 400 also includes partitioning or dividing the plurality of events into one or more groups of events, at 404. For example, in FIG. 2, the partitioning logic 212 may partition the events 216 into the groups 220, 222, and 224.

The method 400 further includes instantiating a query application module for each of the one or more groups based on a compiled query application plan, at 406. Each particular query application module for a particular group is configured to apply a query to events of the particular group to generate partial results. For example, in FIG. 2, the execution module 200 may instantiate the query application modules 230, 232, and 234 for the groups 200, 222, and 224 respectively. The query application modules 230, 232, and 234 may generate partial results 247 by applying the query 202 to the events of the groups 220, 222, and 224, respectively.

The method 400 includes merging the partial results of each of the query application modules to generate output results, at 408. For example, in FIG. 2, the merging logic 250 may merge the partial results from each of the query application modules 230, 232, and 234 to generate the merged results 252. The method 400 also includes providing the output results to an output stream, at 410. For example, in FIG. 2, the merged results 252 may be provided to the output stream 256.

Figure 5:
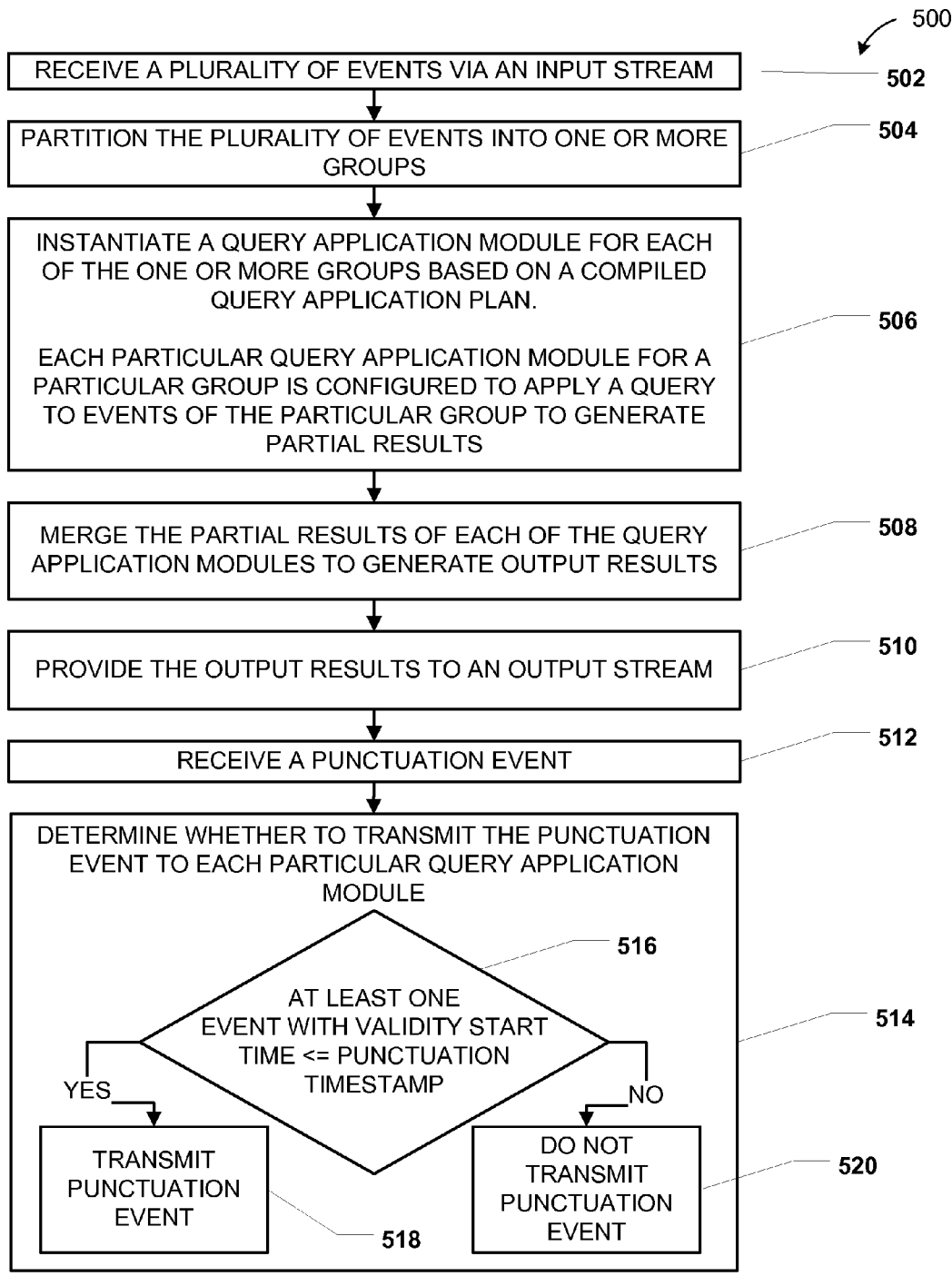
FIG. 5 is a flow diagram to illustrate another particular embodiment of a method of partitioned query execution.

FIG. 5 is a flow diagram to illustrate another particular embodiment of a method 500 of partitioned query execution. In an illustrative embodiment, the method may be performed by the system 100 of FIG. 1 or the execution module 200 of FIG. 2.

The method 500 includes receiving a plurality of events via an input stream, at 502. For example, in FIG. 2, the execution module 200 may receive the events 216 via the input stream 218. The method 500 includes partitioning the plurality of events into one or more groups, at 504. For example, in FIG. 2, the partitioning logic 212 may partition the events 216 into the groups 220, 222, and 224.

The method 500 further includes instantiating a query application module for each of the one or more groups based on a compiled query application plan, at 506. Each particular query application module for a particular group is configured to apply a query to events of the particular group to generate partial results. For example, in FIG. 2, the execution module 200 may instantiate the query application modules 230, 232, and 234 for the groups 200, 222, and 224 respectively. The query application modules 230, 232, and 234 may generate partial results 247 by applying the query 202 to the events of the groups 220, 222, and 224, respectively.

The method 500 includes merging the partial results of each of the query application modules to generate output results, at 508. For example, in FIG. 2, the merging logic 250 may merge the partial results from each of the query application modules 230, 232, and 234 to generate the merged results 252. The method 500 also includes providing the output results to an output stream, at 510. For example, in FIG. 2, the merged results 252 may be provided to the output stream 256.

The method 500 further includes receiving a punctuation event, at 512. For example, in FIG. 2, the events 216 received by the execution module 200 may include a punctuation event. The method 500 includes determining whether to transmit the punctuation event to each particular query application module, at 514. For each particular query application module, the method 500 includes determining whether the particular group associated with the particular query application module includes at least one event with a validity start time prior to or equal to a timestamp of the punctuation event, at 516. When it is determined that the particular group includes such an event, the method 500 includes transmitting the punctuation event to the particular query application module, at 518. When it is determined that the particular group does not include such an event, the method 500 does not transmit the punctuation event to the particular query application module, at 520.

It will be appreciated that the method 500 of FIG. 5 may enable conservation of resources at event processing systems. For example, instead of automatically forwarding punctuation events to all modules, punctuation events may be selectively forwarded in accordance with the method 500 of FIG. 5 to only those query application modules to which the punctuation events are applicable.

Figure 6:
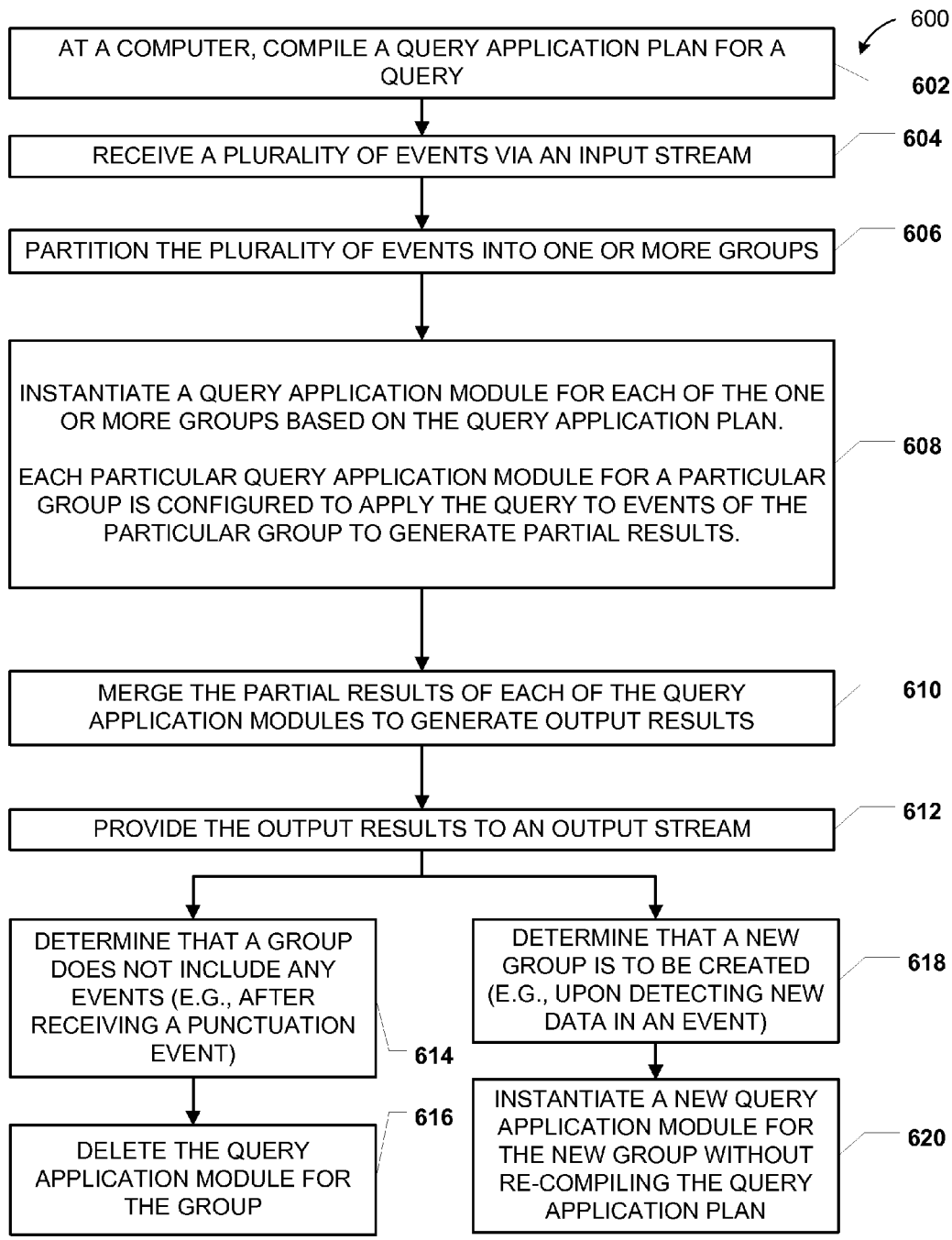
FIG. 6 is a flow diagram to illustrate another particular embodiment of a method of partitioned query execution.

FIG. 6 is a flow diagram to illustrate another particular embodiment of a method 600 of partitioned query execution. In an illustrative embodiment, the method 600 may be performed by the system 100 of FIG. 1 or a system that includes the planning module 208 and the execution module 200 of FIG. 2.

The method 600 includes, compiling (e.g., at a computer) a query application plan for a query, at 602. For example, in FIG. 2, the planning module 208 may compile the query application plan 210 for the query 202. The method 600 includes receiving a plurality of events via an input stream, at 604. For example, in FIG. 2, the execution module 200 may receive the events 216 via the input stream 218.

The method 600 includes partitioning the plurality of events into one or more groups, at 606. For example, in FIG. 2, the partitioning logic 212 may partition the events 216 into the groups 220, 222, and 224. The method 600 further includes instantiating a query application module for each of the one or more groups based on the query application plan, at 608. Each particular query application module for a particular group is configured to apply a query to events of the particular group to generate partial results. For example, in FIG. 2, the execution module 200 may instantiate the query application modules 230, 232, and 234 for the groups 200, 222, and 224 respectively. The query application modules 230, 232, and 234 may generate partial results 247 by applying the query 202 to the events of the groups 220, 222, and 224, respectively.

The method 600 includes merging the partial results of each of the query application modules to generate output results 610. For example, in FIG. 2, the merging logic 250 may merge the partial results from each of the query application modules 230, 232, and 234 to generate the merged results 252. The method 600 also includes providing the output results to an output stream, at 612. For example, in FIG. 2, the merged results 252 may be provided to the output stream 256.

The method 600 further includes efficiently utilizing available resources by deleting existing query application modules and dynamically instantiating new query application modules as needed. When it is determined that a group does not include any events (e.g., after receiving a punctuation event that invalidated all events of the group), at 614, the method 600 includes deleting the query application module for the group, at 616. For example, in FIG. 2, the query application module 230 may be deleted when the group 220 is empty.

When it is determined that a new group is to be created (e.g., upon detecting that a particular received event includes new and previously-unencountered data), at 618, the method includes instantiating a new query application module for the new group without re-compiling the query application plan, at 620. For example, in FIG. 2, a new query application module other than the depicted query application modules 230, 232, and 234 may be instantiated by the execution module 200.

Figure 7:
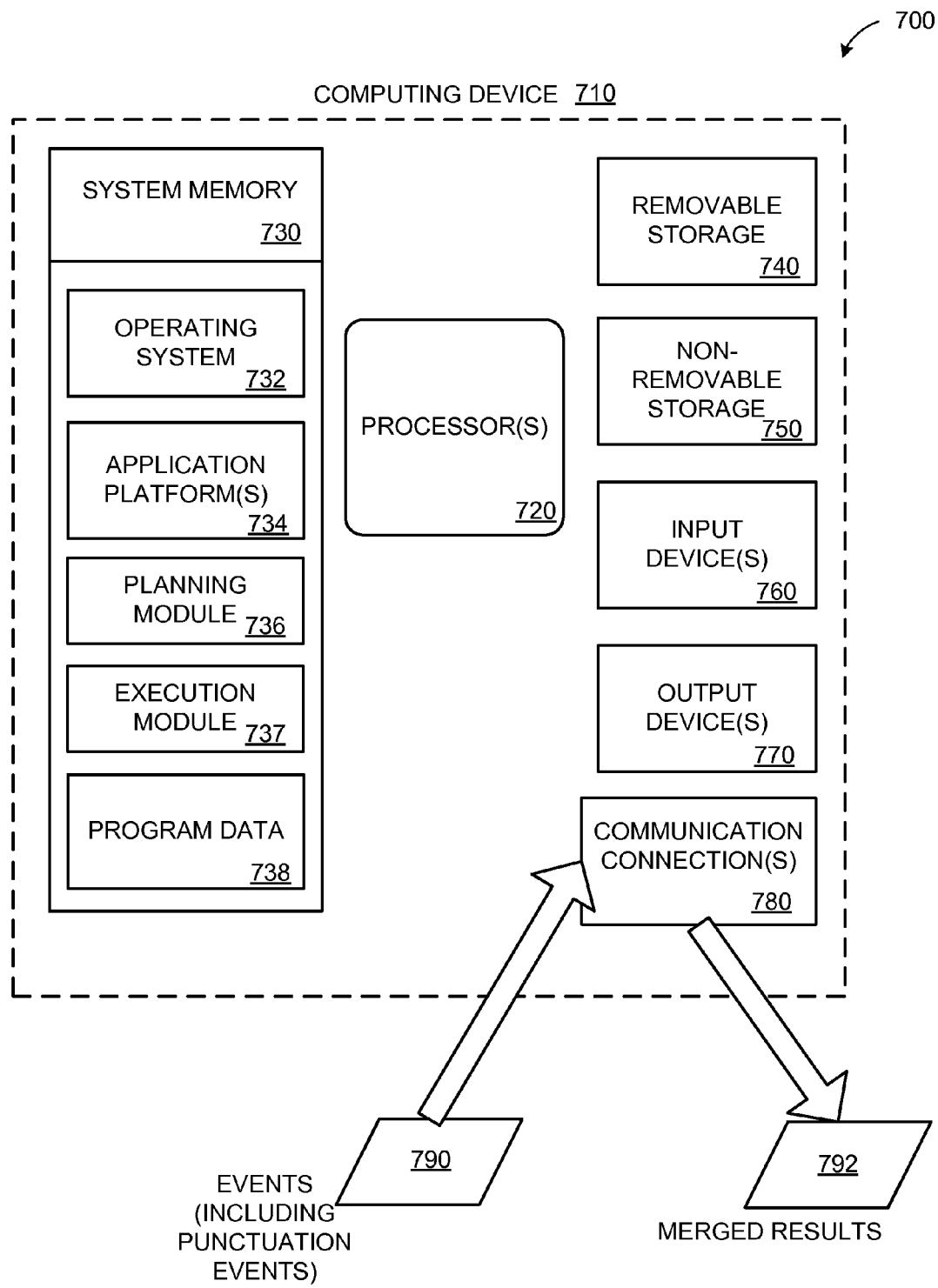
FIG. 7 is a block diagram of a computing environment including a computing device operable to support embodiments of computer-implemented methods, computer program products, and system components as illustrated in FIGS. 1-6.

FIG. 7 depicts a block diagram of a computing environment 700 including a computing device 710 operable to support embodiments of computer-implemented methods, computer program products, and system components according to the present disclosure. In an illustrative embodiment, the computing device 710 may include one or more of the input adapter 110 of FIG. 1, the output adapter 124 of FIG. 1, the compile-time planning module 116 of FIG. 1, the run-time query execution module 120 of FIG. 2, the planning module 208 of FIG. 2, the execution module 200 of FIG. 2, and the query application modules 320 of FIG. 3. Each of the input adapter 110 of FIG. 1, the output adapter 124 of FIG. 1, the compile-time planning module 116 of FIG. 1, the run-time query execution module 120 of FIG. 2, the planning module 208 of FIG. 2, the execution module 200 of FIG. 2, and the query application modules 320 of FIG. 3 may include or be implemented using the computing device 710 or a portion thereof.

The computing device 710 includes at least one processor 720 and a system memory 730. Depending on the configuration and type of computing device, the system memory 730 may be volatile (such as random access memory or "RAM"), non-volatile (such as read-only memory or "ROM," flash memory, and similar memory devices that maintain stored data even when power is not provided), or some combination of the two. The system memory 730 typically includes an operating system 732, one or more application platforms 734, one or more applications (e.g., a planning module 736 and an execution module 737), and may include program data 738 associated with the one or more applications. In an illustrative embodiment, the planning module 736 is the compile-time planning module 116 of FIG. 1 or the planning module 208 of FIG. 2 and the execution module 737 is the run-time query execution module 120 of FIG. 1 or the execution module 200 of FIG. 2.

The computing device 710 may also have additional features or functionality. For example, the computing device 710 may also include removable and/or non-removable additional data storage devices such as magnetic disks, optical disks, tape, and standard-sized or miniature flash memory cards. Such additional storage is illustrated in FIG. 7 by removable storage 740 and non-removable storage 750. Computer storage media may include volatile and/or non-volatile storage and removable and/or non-removable media implemented in any method or technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 710. Any such computer storage media may be part of the computing device 710. The computing device 710 may also have input device(s) 760, such as a keyboard, mouse, pen, voice input device, touch input device, etc. Output device(s) 770, such as a display, speakers, printer, etc. may also be included.

The computing device 710 also contains one or more communication connections 780 that allow the computing device 710 to communicate with other computing devices (e.g., to receive events 790 and to transmit merged results 792) over a wired or a wireless network. In an illustrative embodiment, the communication connections 780 include the adapters 110, 124 of FIG. 1. In another illustrative embodiment, the events 790 include the events 104 of FIG. 1 or the events 216 of FIG. 2. In another illustrative embodiment, the merged results 792 include the results 128 of FIG. 1 or the merged results 252 of FIG. 2. It should be noted that although the events 790 and the merged results 792 are illustrated as communicatively coupled to the communication connections 780, the events 790 and the merged results 792 may be received and transmitted by the computing device 710 via other mechanisms. For example, the events 790 and the merged results 792 may be stored locally at the computing device 710 (e.g., at the removable storage 740 or the non-removable storage 750).

It will be appreciated that not all of the components or devices illustrated in FIG. 7 or otherwise described in the previous paragraphs are necessary to support embodiments as herein described. For example, the input device(s) 760 and the output device(s) 770 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer system, comprising:
   a processor; and
   a memory communicatively coupled to the processor, the memory having computer-executable instructions that when executed by the processor provide one or more modules, the one or more modules further comprising:
   an execution module configured to:
   partition a plurality of events into one or more groups based on a partitioning operator;
   instantiate a query application module for each of the one or more groups, wherein each particular query application module for a particular group includes data associated with the query and group-specific data associated with the particular group, and is configured to apply the query to events of the particular group to generate results, and wherein each query application module for a group comprises logic to execute a plurality of complex event processing (CEP) operators and wherein the logic of each query application module is configured for execution at a separate execution thread of the computer system; and
   merge results of each of the query application modules.

2. The computer system of claim 1, further comprising:
   a planning module configured to generate a query application plan based on a query that includes a partitioning operator, wherein the planning module executes during a compile-time of the computer system and wherein the execution module executes during a run-time of the computer system.

3. The computer system of claim 1, further comprising an input interface configured to receive the plurality of events via an input stream and an output interface configured to provide the merged results to an output stream.

4. The computer system of claim 1, wherein the execution module is further configured to receive a punctuation event and to selectively transmit the punctuation event to each query application module.

5. The computer system of claim 4, wherein the execution module is further configured to not transmit the punctuation event to a query application module for a group upon determining that the group does not include any events having a validity start time previous to or equal to a timestamp of the punctuation event.

6. The computer system of claim 4, wherein each query application module for a group is configured to delete events from the group that are invalidated by the punctuation event.

7. The computer system of claim 1, wherein the execution module is further configured to delete query application modules for empty groups.

8. The computer system of claim 1, wherein the execution module is further configured to instantiate additional query application modules for new groups.

9. The computer system of claim 1, wherein when the partition operator partitions events based on event payload, a number of the query application modules is determined at run-time, and wherein when the partition operator partitions events based on a hash function, the number of the query application modules is determined at compile-time.

10. The computer system of claim 1, wherein each query application module is further configured to merge logic to execute a first CEP operator with logic to execute a second CEP operator and wherein the merged logic executes at a single execution thread of the computer system.

11. A method, comprising:
receiving a plurality of events via an input stream, wherein a query application plan is compiled prior to receiving the plurality of events and wherein the query application plan determines partitioning logic that partitions the plurality of events;
partitioning the plurality of events into one or more groups;
instantiating a query application module for each of the one or more groups, wherein each particular query application module for a particular group is configured to apply a query to events of the particular group to generate partial results;
merging the partial results of each of the query application modules to generate merged output results; and
providing the merged output results to an output stream.

12. The method of claim 11, further comprising receiving a punctuation event.

13. The method of claim 12, further comprising:
determining that a first query application module includes at least one event having a validity start time previous to or equal to a timestamp of the punctuation event; and
transmitting the punctuation event to the first query application module.

14. The method of claim 13, further comprising:
determining that a second query application module does not include at least one event having a validity start time previous to or equal to the timestamp of the punctuation event; and
not transmitting the punctuation event to the second query application module.

15. The method of claim 11, further comprising deleting an existing query application module for a group in response to determining that the group does not include any events.

16. The method of claim 11, further comprising instantiating a new query application module for a new group without re-compiling the query application plan.

17. A computer-readable medium comprising instructions, that when executed by a computer, cause the computer to:
receive a user-defined query that includes a partitioning operator and at least one non-partitioning operator;
compile a query application plan for the query, wherein the query application plan indicates how to parallelize application of the at least one nonpartitioning operator;
during a run-time of the computer, receive a plurality of events via an input stream;
partition the plurality of events into one or more groups based on the partitioning operator;
instantiate a plurality of query application modules based on the compiled query application plan, wherein each particular query application module is associated with a particular group and is configured to apply the at least one non-partitioning operator to events of the particular group to generate partial results, wherein each query application module is associated with a single group;
merge the partial results of each of the query application modules to generate output results; and
provide the output results to an output stream.

18. The computer-readable medium of claim 17, wherein query is a continuously executing complex event processing (CEP) query.

* * * * *